A. DOBROWOLSKI.
AUXILIARY SEAT FOR TRICYCLES.
APPLICATION FILED NOV. 25, 1918.

1,374,911.

Patented Apr. 19, 1921.

Inventor
Alfons Dobrowolski

UNITED STATES PATENT OFFICE.

ALFONS DOBROWOLSKI, OF RACINE, WISCONSIN.

AUXILIARY SEAT FOR TRICYCLES.

1,374,911.      Specification of Letters Patent.      Patented Apr. 19, 1921.

Application filed November 25, 1918. Serial No. 263,959.

*To all whom it may concern:*

Be it known that I, ALFONS DOBROWOLSKI, a citizen of the United States, residing at Racine, county of Racine, and State of Wisconsin, have invented new and useful Improvements in Auxiliary Seats for Tricycles, of which the following is a specification.

My invention relates to improvements in auxiliary seats for tricycles.

The object of my invention is to provide a rear seat attachment which can easily be applied to any ordinary tricycle, and resiliently, but securely, supported, and which can be removed or replaced at pleasure. I propose to provide means for not only removing the seat by leaving its support attached to the rear axle of the tricycle, but I also propose to provide means whereby the support may also be removed from the axle, and replaced at pleasure by any person unskilled in mechanics.

In the drawings:—

Like parts are identified by the same reference characters throughout the several views.

Figure 1:
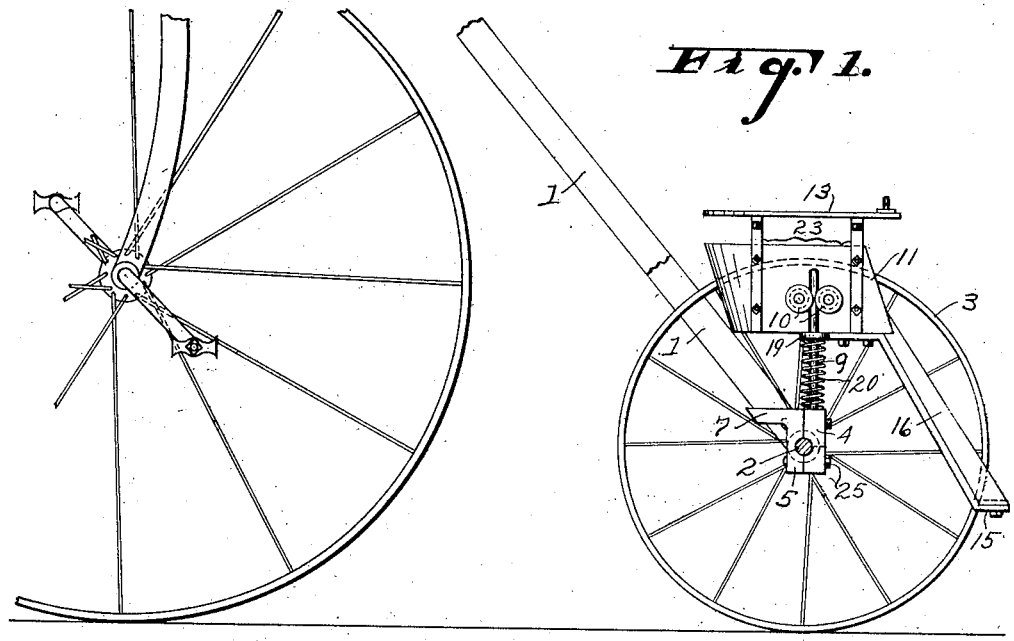
Figure 1 is a side view of a tricycle with my improved attachment applied thereto.
Figure 2:
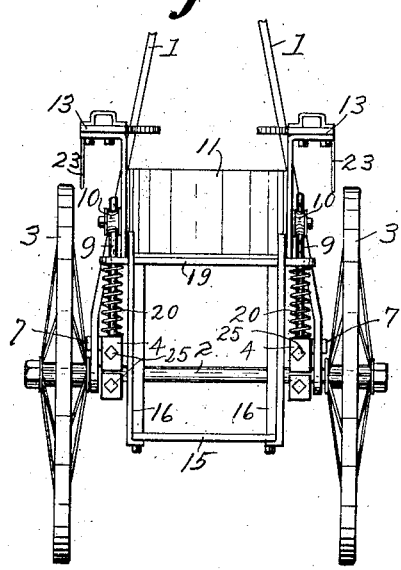
Fig. 2 is a rear view of the same.
Figure 3:
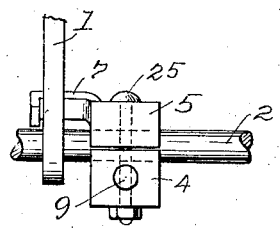
Fig. 3 is a detail view showing a fragment of the rear axle, and one of the rear fork arms, together with the associated clamping members.

The tricycle illustrated in the drawings is of a common type having a set of divergent rear fork arms 1 connected with and supported by the rear axle 2 adjacent to the rear wheels 3.

Sets of clamping members 4 and 5 are adapted to embrace the rear axle adjacent to the respective fork arms 1, and the forward clamping member 5 is provided with a hook arm 7 adapted to pass in front of the fork arm 1, and to engage the latter to prevent the clamping member from rotating upon the axle with its upper end swinging rearwardly.

The clamping member 4 is provided with an upwardly projecting post 9, which passes between guide rollers 10 on the side walls of the rear seat 11. The seat 11 faces rearwardly, and it is preferably provided with arms 13 to protect the hands and arms of the occupant, and also to provide means whereby a small child may be strapped in position in the seat. A foot rest 15 is preferably supported from the seat by ordinary inclined arms 16.

The bottom of the seat is crossed by a flat bar 19 which projects laterally at each side of the seat, and is adapted to rest upon supporting coiled springs 20, these springs being coiled about the posts 9 with their lower ends resting upon the clamping member 4, whereby the weight of the seat and its occupant tends to compress the springs until the latter resiliently support the load thus imposed.

Suitable housings 23 may be applied to the sides of the seat, which inclose the guide rollers 10 and the upper ends of the posts 9, it being understood that there will be one post 9 at each side of the seat, supported by a set of clamping members 4 and 5, secured to the rear axle.

The clamping members may be of any desired form. They are preferably formed to so embrace the axle that they can be secured thereto by means of ordinary bolts 25 passing through them above and below the axle, as shown. It is not essential to my invention whether the clamping members be formed in sets of two or more than two members.

The seat will have little tendency to tip forwardly about the axle, and if this should occur the forwardly tilting or tipping movement will bring the seat into contact with the converging upper portions of the fork arms 1 without injury to the occupant of the seat. But it is very necessary that means be provided for effectually preventing the clamping members from rotating upon the axle in such a manner as to allow the seat to swing rearwardly, and this is accomplished by providing the arms 7 which are adapted to engage against the fork arms 1, and thus furnish absolute security against such a tilting movement. It will be observed that even if, through carelessness, one of the clamping members 5 should be entirely disengaged, the other one with its fork arms 7 would still be effective to hold the seat in an upright position, subject only to a lateral tilting movement in case the clamping member 4 became disengaged from the axle on one side.

I claim:—

1. The combination with the rear wheels, fork and axle of a tricycle, sets of axle engaging clamping members, an arm connected with one clamping member of each set, and adapted to engage in front of an associated arm of the rear fork, a post mounted upon one clamping member of each set, springs coiled about said posts, and a seat supported by the springs between the rear wheels, and provided with guides to receive the upper end portions of the posts.

2. The combination with the frame, rear wheels and axle of a tricycle, of a rearwardly facing seat disposed over said axle, a pair of vertically extending posts connected with the axle near the respective wheels, guides on the seat adapted to loosely engage the posts, springs mounted on the posts and bearing against the under side of said seat to support the same, and connections between the posts and frame of the tricycle to prevent rotative movements of the posts and seat about the axle, said frame being independently connected with and supported by the axle.

3. A rear seat attachment for tricycles, comprising the combination with the rear wheels and axle of a rearwardly facing seat, sets of axle engaging members, springs mounted thereon in supporting relation to the seat, hook shaped connections adapted to loosely engage the frame of the tricycle to prevent rotative movements of the clamping members upon the axle, and post embracing guides connected with the respective sides of the seat, and adapted to prevent tilting movements of the seat upon said springs.

4. The combination with a tricycle having a frame including rear fork, fork supporting axle and wheels, of a support for an auxiliary seat detachably mounted upon the rear axle independently of the frame, and having means to loosely engage the frame to prevent rotation of the support about the axle, an auxiliary seat resiliently mounted on the support and guided thereby for vertical movement independently of the frame.

5. The combination of the rear wheels, fork and axle of a tricycle, of a set of clamping members engaging the rear axle and also the fork near the respective wheels, a seat resiliently supported from the clamping members and guided therefrom along vertical lines, said guiding means comprising a set of upwardly extending posts connected with clamping members, sets of pulley shaped guide rollers carried by the seat, and arranged with the rollers of each set adapted to receive one of the posts between them.

6. The combination of the rear wheels, fork and axle of a tricycle, of sets of clamping members adapted to engage the fork arms adjacent to and between said wheels, and also the axle, an upwardly extending post connected with each set of clamping members, a seat having side walls provided with pulley shaped guide rollers adapted to receive the posts between them, a bearing member connected with the seat, and compression springs coiled about the post and interposed between the bearing member and the sets of clamping members.

7. The combination of the rear fork and axle of a tricycle, of sets of clamping members adapted to engage the fork arms, and also the axle, an upwardly extending post connected with each set of clamping members, a seat having side walls provided with pulley shaped guide rollers adapted to receive the posts between them, a bearing member connected with the seat, compression springs coiled about the post and interposed between the bearing member and the sets of clamping members, a housing connected with the seat at each side thereof, and inclosing the bearing rollers and the upper ends of said posts, and arm rests connected with the seat above said housing.

In testimony whereof I affix my signature in the presence of two witnesses.

ALFONS DOBROWOLSKI.

Witnesses:
O. C. WEBER,
A. J. McKERIHAN.